May 26, 1931.  R. H. MONTIETH  1,807,491
BAIL FOR HAND LANTERNS
Filed Oct. 15, 1930
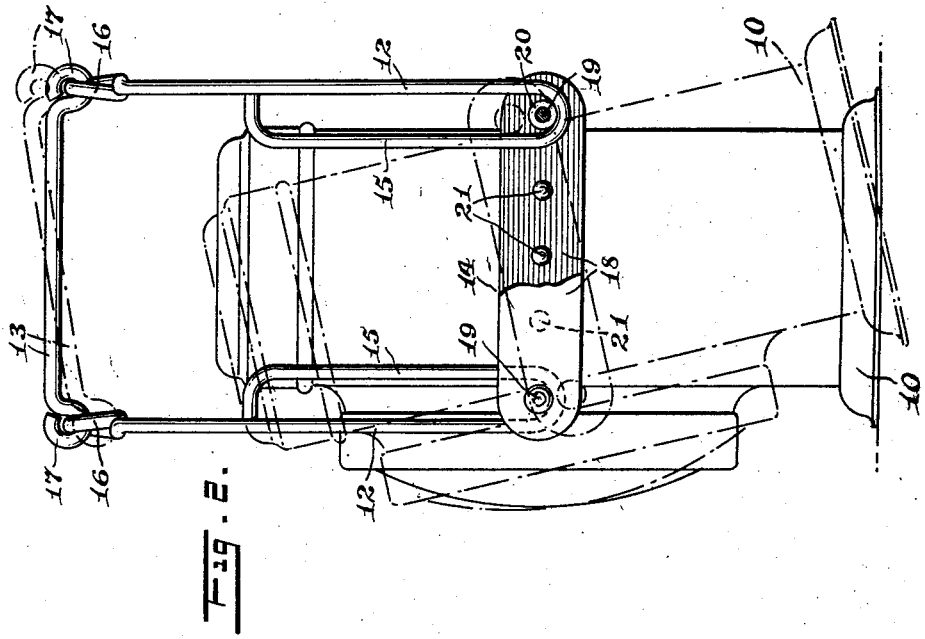
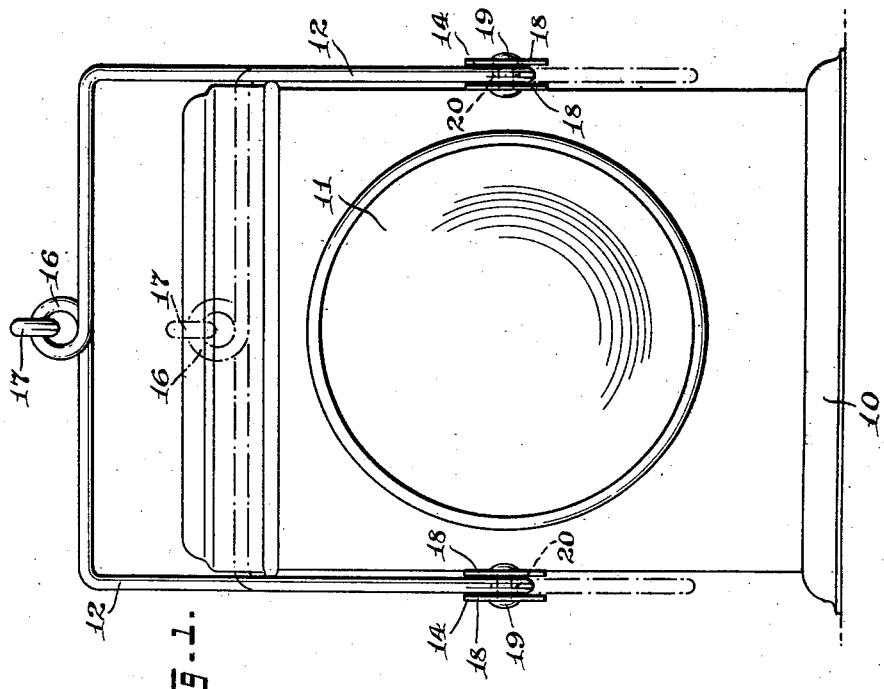
WITNESSES
INVENTOR
Robert H Monteith
BY
ATTORNEYS.

Patented May 26, 1931

1,807,491

UNITED STATES PATENT OFFICE

ROBERT H. MONTEITH, OF LOCKLAND, OHIO

BAIL FOR HAND LANTERNS

Application filed October 15, 1930. Serial No. 488,960.

This invention relates to a bail or handle for lanterns, and has special reference to a bail or handle which may be used advantageously on bull's-eye lanterns and those having lenses.

The invention has for its general object the provision of means of the indicated character which will enable a person to carry a lantern with the hand in a natural position, palm toward the body, and with a slight movement of the hand to throw the beam of light up or down or in any direction.

The invention has for a further object the provision of a lantern bail or handle construction which may be adjusted in relation to the lantern while attached thereto so as to occupy but a minimum of space when not in use.

With the foregoing, other objects of the invention will appear from the embodiment of the invention which by way of example is described in the following specification and illustrated in the accompanying drawings, in which Figure 1 is a front view of a lantern selected to illustrate the bail or handle construction of the present invention, the same being shown in the carrying position in full lines, and in a dropped position in dot and dash lines.

Figure 2 is a side view with portions broken away, and partly in section; the lantern being shown tilted forwardly and downwardly in dot and dash lines by reason of the manipulation of the bail or handle in relation to the lantern as shown in dot and dash lines.

Referring now more particularly to the drawings it will be apparent that there is shown an electric lantern 10 having a bull's-eye or lens 11 mounted in the front wall of its casing. It is to be understood that the bail or handle construction of the present invention while hereinafter described as applied to the type of lantern shown, may be applied to any other types of lanterns.

The bail or handle construction comprises two similar bail members 12, and a grip member 13 connected with the bail members 12, together with means 14 for attaching the bail members 12 to the casing of the lantern. In the present instance each of the bail members 12 is made of wire having its opposite end portions formed into elongated loops 15, and its intermediate portion formed into an eye 16. The grip member 13, in the present instance, is also made of wire, and its opposite ends are formed into eyes 17. Similar means 14 is arranged on each side of the lantern casing preferably half way from the base thereof. The said means 14 is in the form of a mount and consists of narrow plates 18 each fastened together in spaced relation by rivets 19 and spacers 20 which surround the rivets 19 respectively. One of the plates 18 is riveted to the lantern casing as at 21. The loops 15 of the bail members 12 respectively receive therein the spacers 20. In this manner the bail members 12 are slidable and also pivotally connected in relation to the lantern casing. The eyes 17 of the grip member 13 are engaged respectively with the eyes 16 of the bail members 12. It will be apparent that the grip member 13 extends forwardly and rearwardly between the bail members 12 and that the latter are arranged respectively at the front and rear of the lantern casing.

From the foregoing it will be apparent that a person may carry the lantern by gripping the member 13 with the hand in a natural position, and that with a slight movement of the hand may tilt the lantern so as to throw the beam of light up or down or in any direction, due to the pivotal connection of the latter with the attaching means 14. It will also be apparent that the bail members 12 may be dropped down by reason of the sliding connection of the loops with the means 14, so that the lantern will occupy but a minimum of space when not in use.

What is claimed is:

1. A handle comprising attaching means, bail members slidably and pivotally connected with said means, and a grip member extending between said bail members and having its opposite ends pivotally connected respectively with said bail members.

2. A handle comprising bail members having elongated side loops, mounts having means to engage said loops to slidably and pivotally connect the bail members with said mounts, and a grip member extending between the upper ends of the bail members and having its opposite ends pivotally connected respectively with said ends.

3. A handle comprising wire bail members each having its opposite end portions formed into loops, pairs of attaching plates, each pair of plates being fastened together in spaced relation by means including spacers, said loops respectively receiving therein said spacers, whereby said bail members are each pivotally connected with said plates, and a grip member positioned between said bail members and having its opposite ends pivotally connected respectively with said bail members.

4. A handle comprising wire bail members each having its opposite end portions formed into elongated loops, pairs of attaching plates, each pair of plates being fastened together in spaced relation by means including spacers, said loops respectively receiving therein said spacers, whereby said bail members are each slidably and pivotally connected with said plates, and a grip member positioned between said bail members and having its opposite ends pivotally connected respectively with said bail members.

5. A handle comprising wire bail members each having its opposite end portions formed into loops and its intermediate portion formed into an eye, pairs of attaching plates, each pair of plates being fastened together in spaced relation by means including spacers, said loops respectively receiving therein said spacers, whereby said bail members are each pivotally connected with said plates, and a wire grip member having an eye on each end positioned between said bail members and having its eyes engaged with the eyes of the bail members.

6. The combination with a lantern having a front lens, of bail members slidably and pivotally connected respectively near the front and rear of the lantern, and a grip member extending forwardly and rearwardly between said bail members and having its opposite ends pivotally connected respectively with said bail members.

ROBERT H. MONTEITH.